(12) United States Patent
Kouris et al.

(10) Patent No.: US 6,179,560 B1
(45) Date of Patent: Jan. 30, 2001

(54) TURBOMACHINERY MODULE WITH IMPROVED MAINTAINABILITY

(75) Inventors: Konstantino Kouris, Madison; John A Leogrande, West Hartford, both of CT (US)

(73) Assignee: United Technologies Corporation, Hartford, CT (US)

( * ) Notice: Under 35 U.S.C. 154(b), the term of this patent shall be extended for 0 days.

(21) Appl. No.: 09/212,719

(22) Filed: Dec. 16, 1998

(51) Int. Cl.[7] .................................................. F01D 1/02
(52) U.S. Cl. .................. 415/190; 415/191; 415/209.4
(58) Field of Search ................................. 415/115, 189, 415/190, 191, 209.2, 209.3, 209.4

(56) References Cited

U.S. PATENT DOCUMENTS

| | | | | |
|---|---|---|---|---|
| 3,104,091 | * | 9/1963 | Vivian | 415/190 |
| 3,302,926 | * | 2/1967 | Bobo | 415/189 |
| 5,848,874 | * | 12/1998 | Humann et al. | 415/189 |
| 5,868,398 | * | 12/1998 | Maier et al. | 415/191 |

* cited by examiner

*Primary Examiner*—Edward K. Look
*Assistant Examiner*—Hermes Rodriguez
(74) *Attorney, Agent, or Firm*—Kenneth C. Baran (57) ABSTRACT

The invention is a turbomachinery module (10) whose forwardmost vanes, which are the most damage susceptible vanes in the module, are easily removable and replaceable without substantial disassembly of the module. The module includes a case (12) and a forwardmost array (1V) of vanes. Each vane (34) of the forwardmost array has an axially proximal and distal end (90, 92) relative to the forward end (16) of the case. The distal end of each vane has a foot (102) that abuts but is not connected to a vane guide (32) on the case. The proximal end of each vane has an attachment bracket (110) that can be secured to or disengaged from a vane support (28) on the case. Vane removal is accomplished by disengaging the attachment bracket (110) from the vane support (28) and withdrawing the vane through the forward end of the case. The invention improves upon conventional turbine modules in which the forwardmost vane array is removable only from the aft end of the case after the module has been substantially disassembled. As a result the damage susceptible vanes can be accessed and serviced in less time and at a lower cost than would otherwise be possible.

19 Claims, 6 Drawing Sheets

TURBOMACHINERY MODULE WITH IMPROVED MAINTAINABILITY

TECHNICAL FIELD

This invention relates to turbomachinery modules having one or more arrays of stator vanes, and particularly to a module in which the vanes most susceptible to damage and deterioration are conveniently removable without substantial disassembly of the module.

BACKGROUND OF THE INVENTION

Modern turbomachines comprise a number of individual modules, each readily separable from its neighboring modules to facilitate maintenance and repair. The principal modules of a typical turbomachine include at least a low pressure compressor, a high pressure compressor, a combustor, a high pressure turbine and a low pressure turbine, all arranged in series along an axially extending centerline. Each compressor and turbine module includes a case that circumscribes one or more axially alternating arrays of blades and vanes. The blades are secured to a rotatable hub so that they project radially from the hub toward the case and span a working medium flowpath. The vanes extend radially inwardly from the case and, like the blades, span across the working medium flowpath. An array of blades and an axially adjacent array of vanes is referred to as a stage.

During operation the compressors pressurize a stream of working medium fluid, usually ambient air, impelling the air to flow into the combustor. A set of fuel injectors introduces fuel into the air stream to produce a fuel-air mixture that readily ignites and burns, releasing the energy content of the fuel. The resulting high pressure combustion products then partially expand through the turbines to drive the compressors. Finally, the partially expanded combustion products flow through a power converter where they expand further to ambient pressure. Typical examples of power converters include an exhaust nozzle that generates propulsive thrust for an aircraft or a power turbine for driving pumps, generators, propellers or other equipment requiring power and rotary motion.

The high pressure turbine operates in a hostile and demanding environment. The combustion products entering the high pressure turbine are extremely hot, sometimes exceeding 2500° F. (1370° C.), and highly corrosive. Moreover the combustion products flow through the turbine with a considerable velocity and may carry small particulates capable of eroding the surfaces of the turbine blades and vanes. Therefore, turbomachinery manufacturers specify a maximum service interval for the high pressure turbine module. At the expiration of the service interval, maintenance technicians separate the high pressure turbine module from the turbomachine, substantially disassemble the module, and refurbish or replace the blades, vanes and other internal components. The requirement to substantially disassemble the module is not a significant hardship since high pressure turbine modules are customarily compact, both axially and radially, and often contain only a single stage of blades and vanes. Moreover, complete disassembly is justifiable since nearly all the internal components require repair, replacement or at least a thorough inspection at the end of the specified service interval.

The low pressure turbine module, by contrast, operates in a less punishing environment since the temperature, corrosive potential and velocity of the combustion products diminish considerably as the combustion products flow through the high pressure turbine. Therefore, the specified service interval of a low pressure turbine is usually two to three times as long as that of a high pressure turbine. That is, complete disassembly and comprehensive service of a low pressure turbine is usually necessary only at the conclusion of every second or third high pressure turbine service interval. Nevertheless it may occasionally be necessary to conduct unscheduled service on selected internal components of a low pressure turbine prior to reaching the end of its service interval. The components most susceptible to damage, and therefore most likely to require unscheduled service, are the forwardmost components of the low pressure turbine module, usually an array of stator vanes.

Unfortunately low pressure turbine modules are not ordinarily configured for easy, convenient removal of the forwardmost vanes. The diameter of a typical low pressure turbine case increases appreciably between its forward and aft ends to accommodate expansion of the combustion products. Therefore, the module is normally designed so that the blade and vane arrays are installable and removable sequentially from the aft, larger diameter end of the module. Although this arrangement facilitates complete assembly and disassembly of the module, it is neither time efficient nor cost effective if only the forwardmost vanes require removal and service. This is particularly true since the low pressure turbine module is heavy, unwieldy and contains multiple stages of blades and vanes.

The need to repair or replace the forwardmost vanes prior to expiration of the specified service interval for the low pressure turbine module might be avoided by constructing the vanes of more exotic materials, by applying thermal barrier, erosion resistant and corrosion resistant coatings to the exposed surfaces of the vanes, or by cooling the vanes with relatively cool air diverted from one of the compressors. However all of these options are unappealing since they add weight, cost or complexity to the engine.

What is needed is a turbomachinery module whose damage susceptible vanes are removable and installable through a designated end of the module, and particularly a turbine module whose forwardmost vanes are conveniently removable and installable through the forward, small diameter end of the case.

SUMMARY OF THE INVENTION

According to the invention a turbomachinery module includes a case and an array of vanes uniquely configured so that the vanes may be removed without substantial disassembly of the module. In particular, one end of the case is designated as the end from which it is desired to remove the vanes, and each vane has an axially proximal and distal end relative to the designated end of the case. The distal end of each vane has a foot that abuts but is not connected to a vane guide on the case. The proximal end of each vane has an attachment bracket that can be secured to or disengaged from a vane support on the case. Vane removal is accomplished by disengaging the attachment bracket from the vane support and withdrawing the vane through the designated end of the case.

The principal advantage of the invention is that it obviates the need to substantially disassemble an entire turbomachinery module when only a single array of damage susceptible vanes requires removal and service. As a result the module can be serviced in less time and at a lower cost than would otherwise be possible. A second advantage is that the invention dispenses with the need to use exotic materials, protective coatings or complicated cooling schemes to extend the durability of the damage susceptible vanes so that they require service only when the entire module is scheduled for substantially complete disassembly.

The foregoing features and advantages and the operation of the invention will become more apparent in light of the following description of the best mode for carrying out the invention and the accompanying drawings.

BEST MODE FOR CARRYING OUT THE INVENTION

Figure 1:
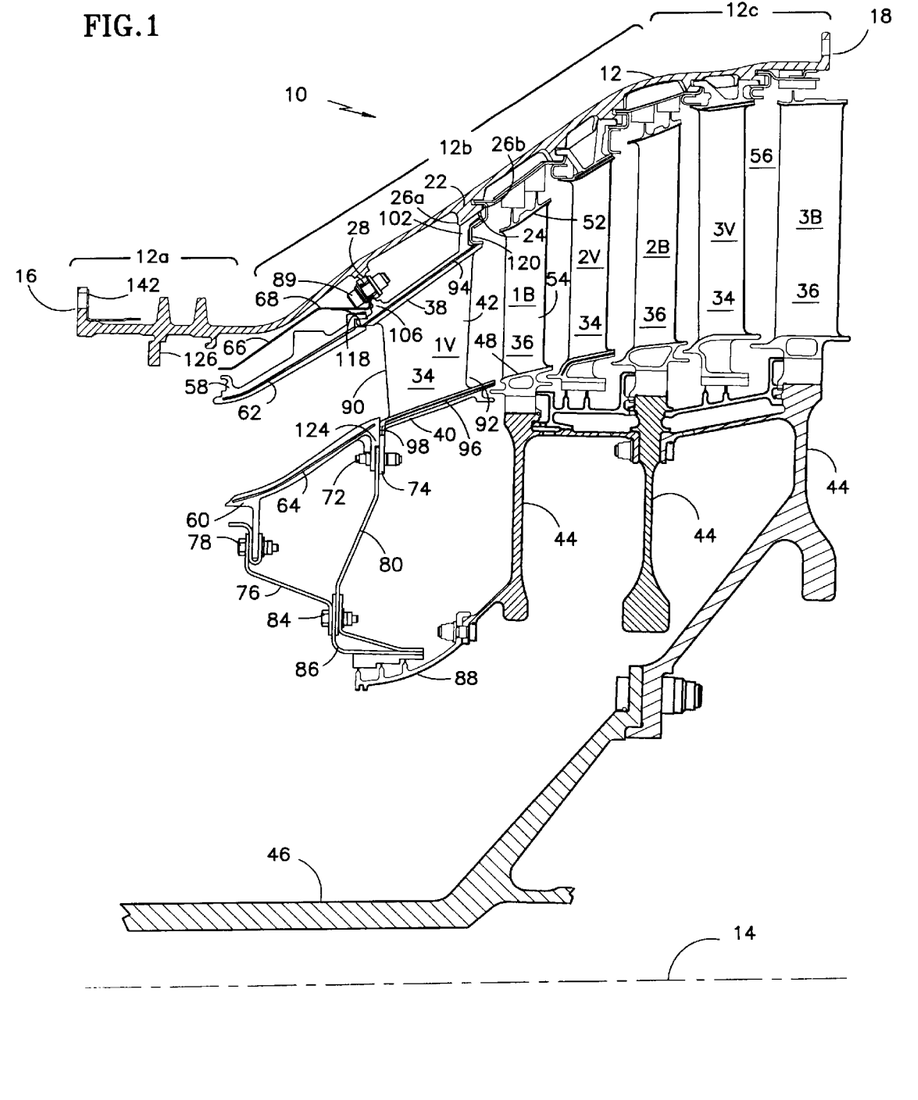
FIG. 1 is a cross sectional side elevation of a gas turbine engine turbine module constructed according to the present invention and showing a case and a forwardmost vane array uniquely configured so that the members of the vane array may be removed from the module through the forward end of the case.
Figure 1A:
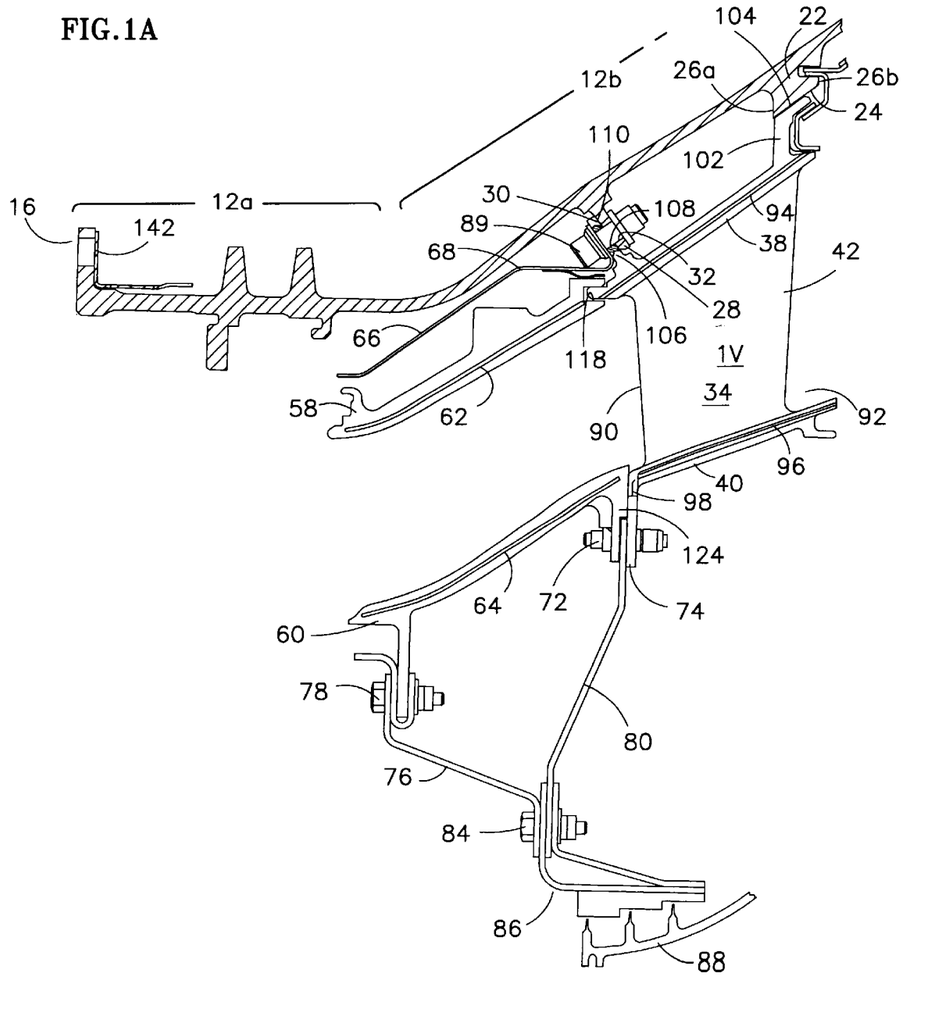
FIG. 1A is an enlarged view of the forwardmost portion of FIG. 1.

FIGS. 1 and 1A illustrate a low pressure turbine module 10 for an aircraft gas turbine engine. The module includes a turbine case 12 disposed about an axially extending centerline 14. The case extends axially from a forward, relatively small diameter end 16 to an aft, relatively large diameter end 18. The case has an approximately cylindrical forward wall 12a, an approximately frustoconical intermediate wall 12b and an approximately cylindrical aft wall 12c. The intermediate wall 12b includes a vane guide 22 with a guide surface 24 oriented approximately parallel to the frustoconical profile of the intermediate wall 12b. That is, the diametral difference between the forward and aft edges 26a, 26b of the guide surface is about the same as the difference in the diameter of intermediate wall 12b over the same axial distance. The intermediate wall also includes a vane support. The illustrated vane support is a set of circumferentially distributed vane support lugs 28 that extend inwardly from the intermediate wall. However the vane support may also be a circumferentially extending ring. Each support lug has a contact surface 30 oriented substantially perpendicular to the guide surface 24. A bolt hole 32 extends through each vane support lug in a casewise direction, i.e. in a direction substantially parallel to the frustoconical profile of intermediate wall 12b.

The case circumscribes three arrays 1V, 2V, 3V of stator vanes 34 and three arrays 1B, 2B, 3B of rotor blades 36. The stator vanes extend radially inwardly from the case toward the centerline, and each vane 34 comprises an outer shroud 38, an inner shroud 40, and an airfoil 42 extending radially between the shrouds. The rotor blades project radially outwardly from hubs 44 coupled directly or indirectly to a rotatable shaft 46. Each blade includes an inner shroud 48, an outer shroud 52 and an airfoil 54 extending radially between the shrouds. The outer and inner shrouds 38, 40, 48, 52 collectively define the effective inner and outer boundaries of a flowpath 56 for conducting a working medium fluid through the turbine module.

The module also includes an annular transition duct for directing combustion products from the high pressure turbine module (not shown) to the low pressure turbine module. The transition duct comprises nine arcuate outer duct segments 58 and nine arcuate inner duct segments 60, each segment subtending slightly less than 40° of arc so that a small intersegment space separates each outer and inner duct segment from its circumferentially adjacent neighbors. A featherseal slot 62, 64 extends along both lateral edges of each segment. Intersegment featherseals (not shown) extend between circumferentially adjacent slots 62 of outer segments 58 and between circumferentially adjacent slots 64 of inner segments 60 to bridge the intersegment spaces and prevent fluid leakage out of the flowpath. Each featherseal has a circumferential dimension greater than the circumferential width of the intersegment spaces but small enough to ensure some circumferential free play between the segments of a fully assembled transition duct. Such dimensioning ensures that the featherseals are positively trapped in the slots 62 or 64 of circumferentially adjacent segments, but also allows the outer segments 58 (and the inner segments 60) to slide circumferentially relative to each other to facilitate assembly and disassembly as described in more detail below. In a fully assembled engine the outer transition duct segments 58 are axially trapped between the high pressure turbine module and the first stage vane array 1V of the low pressure turbine module. The inner transition duct segments 60 are secured by bolts 72 to seal support lugs 74 extending inwardly from each vane 34 of the first vane array 1V. A forward seal land support ring 76 is secured by bolts 78 to the inner transition duct segments 60, and an aft seal land support ring 80 is secured by bolts 72 to the seal support lugs 74. bolts 84 secure a seal land 86 to the innermost extremities of the support rings 76, 80. The seal land cooperates with a knife edge ring 88 extending from the forwardmost hub 44 to define an airseal.

A transition duct heatshield comprising nine arcuate heatshield segments 66 circumscribes the outer transition duct segments to shield the case 12 from the heat of the combustion products flowing through the transition duct. Each heatshield segment has a cylindrical arc portion 68 with a local apertures (not visible) extending therethrough to provide access to retaining bolts 89, which secure the heatshield segments to the case.

Figure 2:
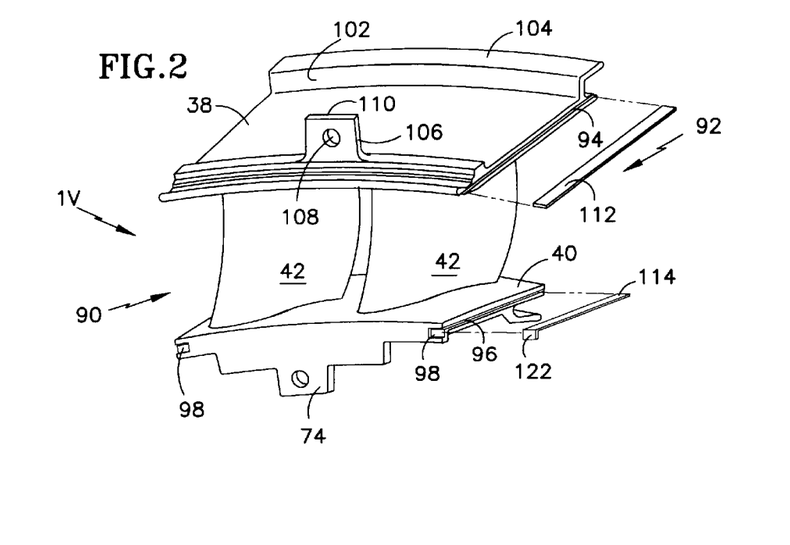
FIG. 2 is a perspective view of the forwardmost vane of FIG. 1.

Referring in addition now to FIG. 2, the vanes 34 of the forwardmost stator vane array 1V, are uniquely configured to be conveniently removable from or installable into the turbine module from a designated end of the case 12, specifically, the forward or small diameter end 16. This is contrary to conventional practice in which the vanes of the other arrays, (2V, 3V) the hubs 44, and the blades of blade arrays (1B, 2B and 3B) must all be removed from the aft, large diameter end of the case before removing the vanes of the first vane array 1V. Each vane 34 of array 1V includes an outer shroud 38, an inner shroud 40 and at least one airfoil 42 extending between the shrouds. Each vane has a proximal end 90 and a distal end 92 relative to the designated, small diameter end 16 of the case. The proximal end is the end closer to the designated end 16 of the case, and the distal end is the end more remote from the designated end of the case when the vanes are installed in the turbine module. Featherseal slots 94, 96 extend the entire length of each lateral edge of both the outer shroud and the inner shroud. The inner slots 96 include a small recess 98 formed in the forward face of the inner shroud. The distal end 92 of the outer shroud 38 includes a foot 102 with an abutment surface 104. The proximal end 90 of the outer shroud includes an outwardly extending ear 106 that serves as an attachment bracket for removably securing the vane to the support lug 28 on case 12. The ear has a single bolt hole 108 extending therethrough and a contact surface 110 facing the distal end of the vane. The abutment surface 104 and the ear contact surface 110 are substantially perpendicular to each other. In the assembled module the ear bolt hole 108 is aligned with the corresponding support lug bolt hole 32 (FIGS. 1 and 1A). The shank of a bolt 89 extends through the holes 32, 108 to bring ear contact surface 110 and lug contact surface 30 into mutual contact, thereby removably securing the vane to the case.

The lug and ear bolt holes 32, 108 are dissimilarly sized so that at least one set of holes is oversized relative to the diameter of the bolt shanks 89. Thus, the vanes are secured to the case at least in part by frictional resistance between the contact surfaces 30 110. If desired, one or both of the contact surfaces may be textured or roughened to enhance the frictional resistance. The use of dissimilarly sized holes simplifies case manufacture since the holes 32 in the vane support lug (or the holes 108 in the attachment ears) may be slightly mispositioned, both circumferentially and radially, without adversely degrading the ability to align the holes 32 and 108 during module assembly. This tolerance for misprecision helps to control the cost of case and vane manufacture.

Each vane may include multiple attachment ears 106, (or a single ear with multiple holes 108). However a single point attachment is preferred to minimize thermally induced stresses. During engine operation the outer shroud 38 is exposed to a radial temperature gradient of up to about 400° F., with the radially inner surface of the outer shroud being hotter than its radially outer surface. The radial temperature gradient tends to straighten the curvature of the shroud. Multiple attachment points offer appreciable resistance to the curvature change and therefore introduce significant stress into the case and the vane outer shroud. By contrast, a single lug offers no resistance to the thermally induced curvature change.

The angle between the case guide surface 24 and the lug contact surface 30 is substantially the same as the angle between the foot abutment surface 104 and the ear contact surface 110. Consequently, the bolted connection between the ear and the lug brings the foot 102 into abutting but nonfastened relationship with the vane guide 22. In principle, any common angle will suffice, but a 90° angle simplifies case manufacture. Because of the abutting relationship, the vane guide 22 supports the distal end of the vane radially, reacting aerodynamic loads that tend to pivot the vane and urge the foot 102 radially outwardly against the guide.

The complete vane array 1V comprises eighteen individual vanes of the type depicted in FIG. 2. Each vane shroud 38, 40 subtends an arc of slightly less than 20°, leaving a small intervane gap of about 0.15 degrees (about 9.2 minutes of arc) between the shrouds of adjacent vanes of the vane array. Outer and inner featherseals 112, 114 are captured circumferentially in the featherseal slots 94, 96 and span the intervane gap to prevent fluid leakage out of the flowpath 56. A ledge 118 (FIG. 1) at the aft end of each outer transition duct segment 58, and an array of serpentine heatshield segments 120 prevent the outer featherseal 112 from being dislodged in the forward and aft directions. The inner featherseals are retained in the forward and aft directions by a tab 122 on the forward end of the inner featherseals 114. The tab is trapped in vane recess 98 by a flange 124 on the aft end of the inner transition duct segment 60 to block forward and aftward movement of the featherseal 114.

The above described configuration significantly simplifies removal of the first stage vanes 1V from the turbine module. To remove the vanes, maintenance technicians separate the low pressure turbine module 10 from the high pressure turbine module to expose the forward end 16 of the low pressure module. The technicians then select an arbitrary circumferential location and move the outer transition duct segments 58 circumferentially away from the selected location by sliding one group of segments in the clockwise direction and the remaining segments in the counterclockwise direction. Circumferential movement of the segments is possible because of the above described intersegment spaces and circumferential free play between adjacent segments. The movement of the segments opens up an access space between two adjacent segments. The access space is circumferentially wider than the featherseal extending between the shrouds, making it easy to extract the featherseal and withdraw it through the designated end 16 of the case. With the featherseal thus removed, either of the duct segments adjacent to the access space may then be slid back into the space and disengaged from its other neighbor. The segment then is translated axially until the aft end of the segment axially clears the forwardmost extremity of the vane outer shroud 38. The duct segment is then translated radially inwardly and finally is withdrawn axially from the designated end of the case. Removal of the segment considerably enlarges the access space and facilitates similar removal of the remaining eight outer duct segments. The maintenance technicians then remove the nine heatshield segments 66 by removing the retaining bolts 89. The bolts are accessible through local apertures, not visible in the illustrations, in the cylindrical arc portions 68 of each heatshield segment. Removal of bolts 89 also disengages the vane attachment ear 106 from the vane support lug 28 to separate the vane from the case.

The maintenance technicians then unfasten bolts 78, 84 and remove the forward seal land support ring 76. Bolts 72, which are rendered accessible by removal of the support ring 76, are then removed to release the inner duct segments 60 from the seal support lugs 74 on the first stage vanes 1V. The inner transition duct segments and their associated featherseals may then be withdrawn using a procedure similar to that already described for the outer segments. The aft seal land support ring 80 and the seal land 86 are then removed through the designated end of the case.

Next, the maintenance technicians grasp the intervane featherseals 112, 114 (FIG. 2) with a forceps (or similar tool capable of reaching into the small intervane gap) and slide the featherseals parallel to their respective shrouds to effect their removal. Removal of the featherseals in this manner is possible because the outer and inner featherseal slots 94, 96 extend to the forwardmost extremity of the vane shrouds 38, 40. Thus, the featherseals are both visible and accessible following removal of the transition duct segments.

Figure 1B:
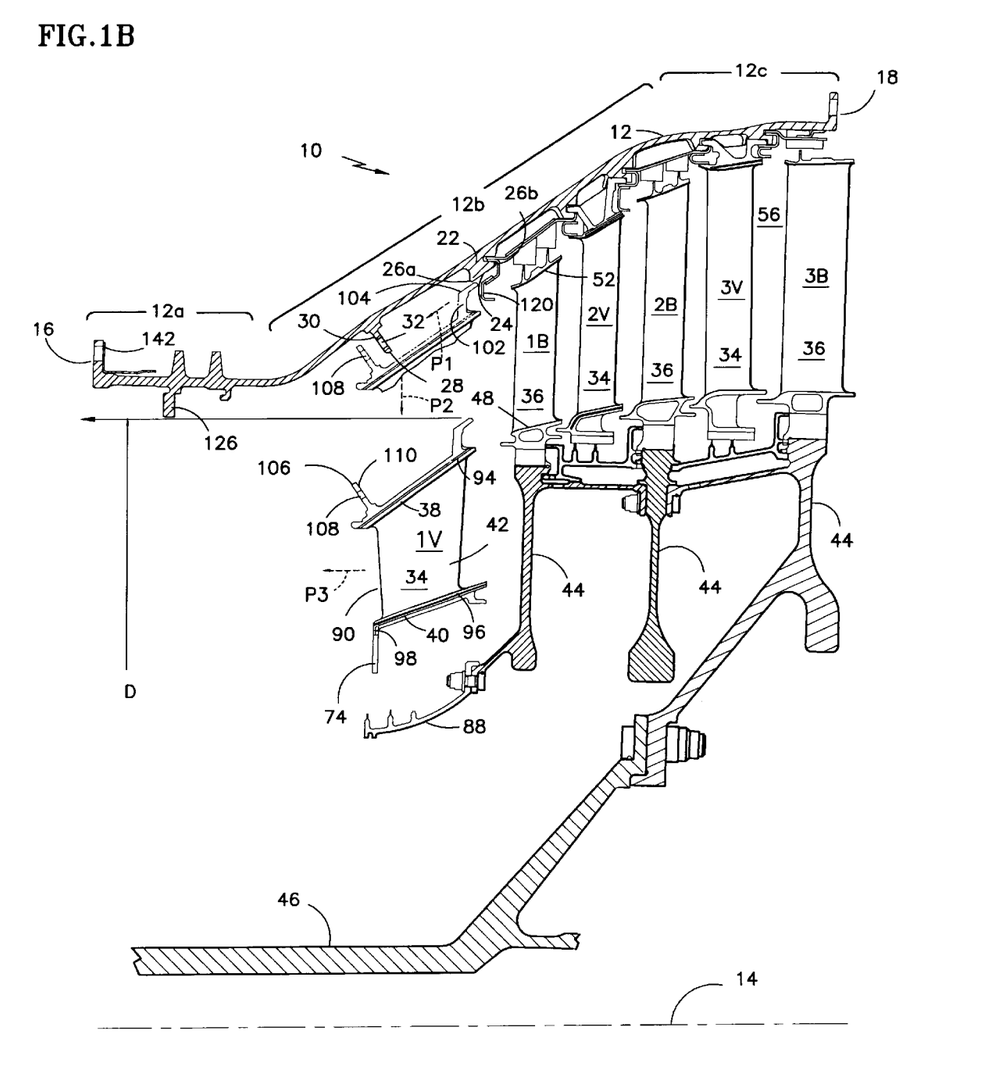
FIG. 1B is a view similar to that of FIG. 1 showing part of a disassembly sequence for removing a member of the forwardmost vane array from the forward end of the module.

The maintenance technicians then remove the first stage vanes 1V, beginning with an arbitrarily selected vane. Referring to FIG. 1B, the selected first stage vane is removed by first translating it in a casewise direction $P_1$ until the aftmost extremity of vane foot 102 clears the front end of the serpentine heatshield 120. The vane is then translated in direction $P_2$ toward the module centerline until it is entirely within a controlling diameter D. In the illustrated module the controlling diameter is the inner diameter of case rail 126. In principle, the vane may be translated toward the centerline along a direct radial path $P_2$ as illustrated. In practice, other hardware in the interior of the module may block a straight radial path. In such circumstances it will be necessary to remove the vane along some other path (e.g. along a stepwise path with axial, casewise and radial components, or along an oblique path) or to rock the vane about an axis to clear the internal obstructions. Once the vane is entirely within the controlling diameter D, it may be withdrawn axially along path $P_3$. After the arbitrarily selected vane has been removed, the remaining seventeen vanes may be similarly extracted.

Figure 3:
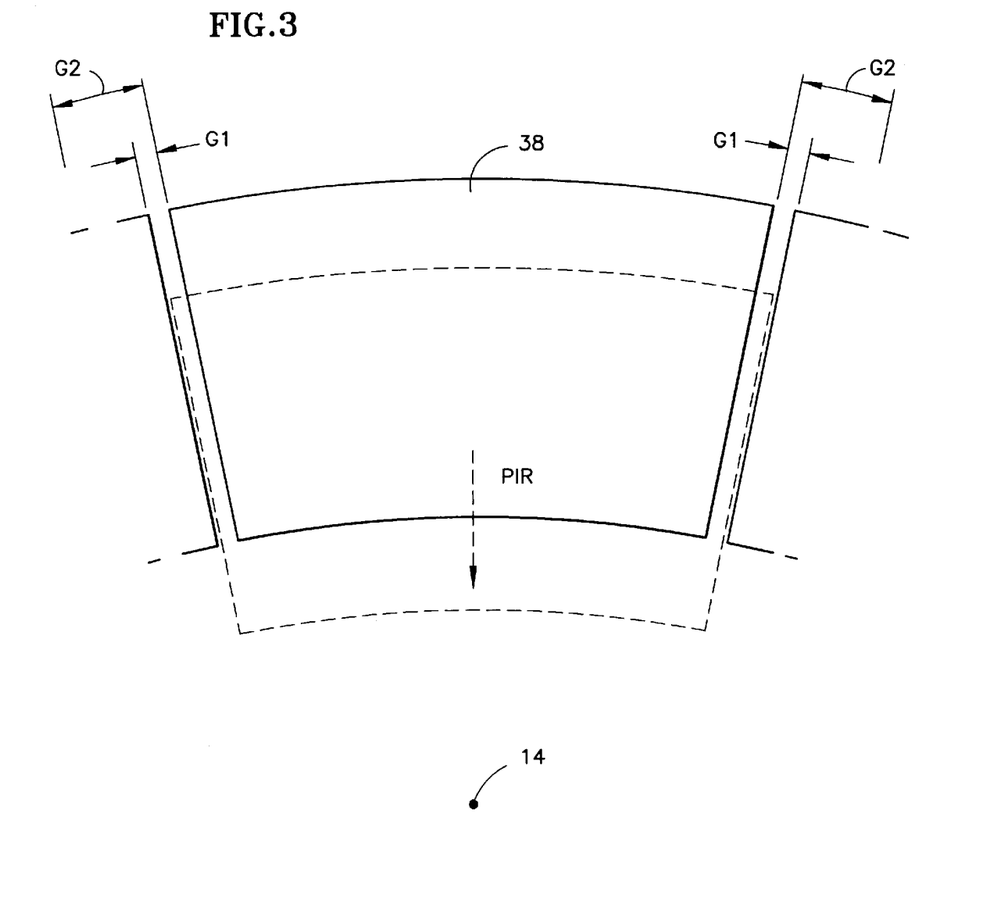
FIG. 3 is a schematic view looking aftwardly in a direction parallel to the module centerline and showing a preparatory step in the disassembly sequence.

The above described method for removing the vanes themselves may, in many instances, require a preparatory step. The preparatory step is necessary if the amount of casewise translation required required for vane foot 102 to clear heatshield 120 is large, and the intervane gap is small. In this instance, the outer (or inner) shrouds of adjacent vanes may come into contact and resist further casewise translation before the foot clears the heatshield. The contact occurs because as the first of the eighteen vanes to be removed is translated in the casewise direction, its larger diameter, more rearwardly disposed shroud sections also move radially inwardly into the smaller circumferential space vacated by the smaller diameter, more forwardly disposed sections of the shroud. This is seen schematically in FIG. 3 where the outer shroud 38 of a selected vane is shown in its original position (solid) and after having been translated in the casewise direction (phantom). The casewise translation (indicated in the Figure by its radial component $P_{1R}$) causes the larger diameter, more rearwardly disposed sections of the shroud to encroach radially inwardly into the space previously occupied by lower diameter more forwardly disposed shroud sections. The average clearance gap $G_1$ between adjacent vanes accommodates only a limited amount of such encroachment before the selected vane contacts the adjacent vanes. If the amount of casewise translation achieved prior to contact is less than the required amount, the vane array 1V will be effectively trapped in the module.

The above described difficulty is avoided by a preliminary step conducted prior to casewise translation of the arbitrarily selected vane. The vanes on either side of the selected vane are slid circumferentially, some clockwise and the others counterclockwise, to accumulate the individual 0.15° intervane gaps $G_1$ into two larger gaps $G_2$, each about 1.35°, on either side of the selected vane. The additional circumferential space between adjacent vanes accommodates sufficient casewise translation of the selected vane to ensure that its foot 102 clears the serpentine seal 120 as seen in FIG. 1A.

Figure 4:
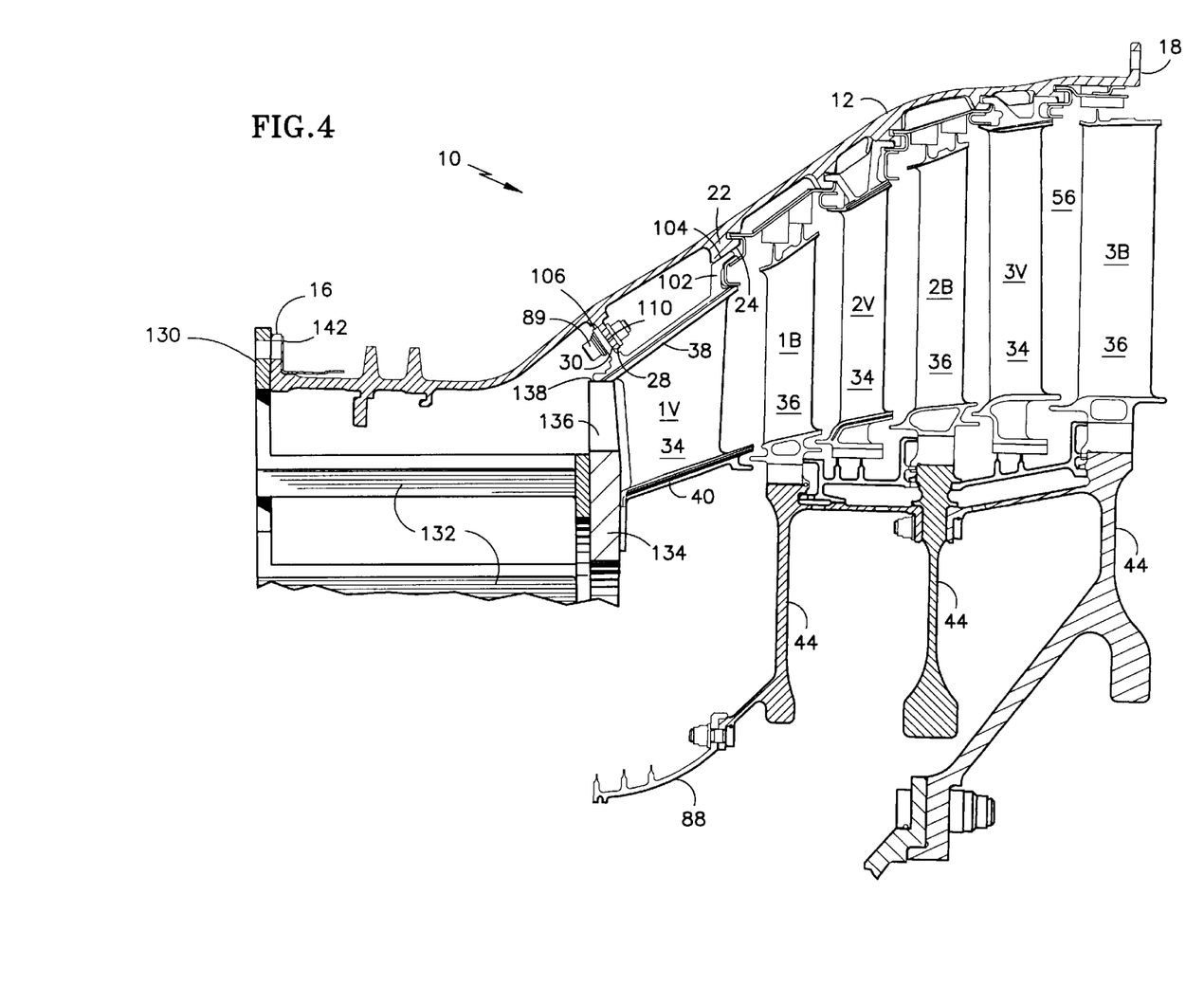
FIG. 4 is a cross sectional side elevation of the gas turbine engine turbine module of FIG. 1 illustrating the use of a special purpose fixture to install the forwardmost vane array in the turbine module.
Figure 4A:
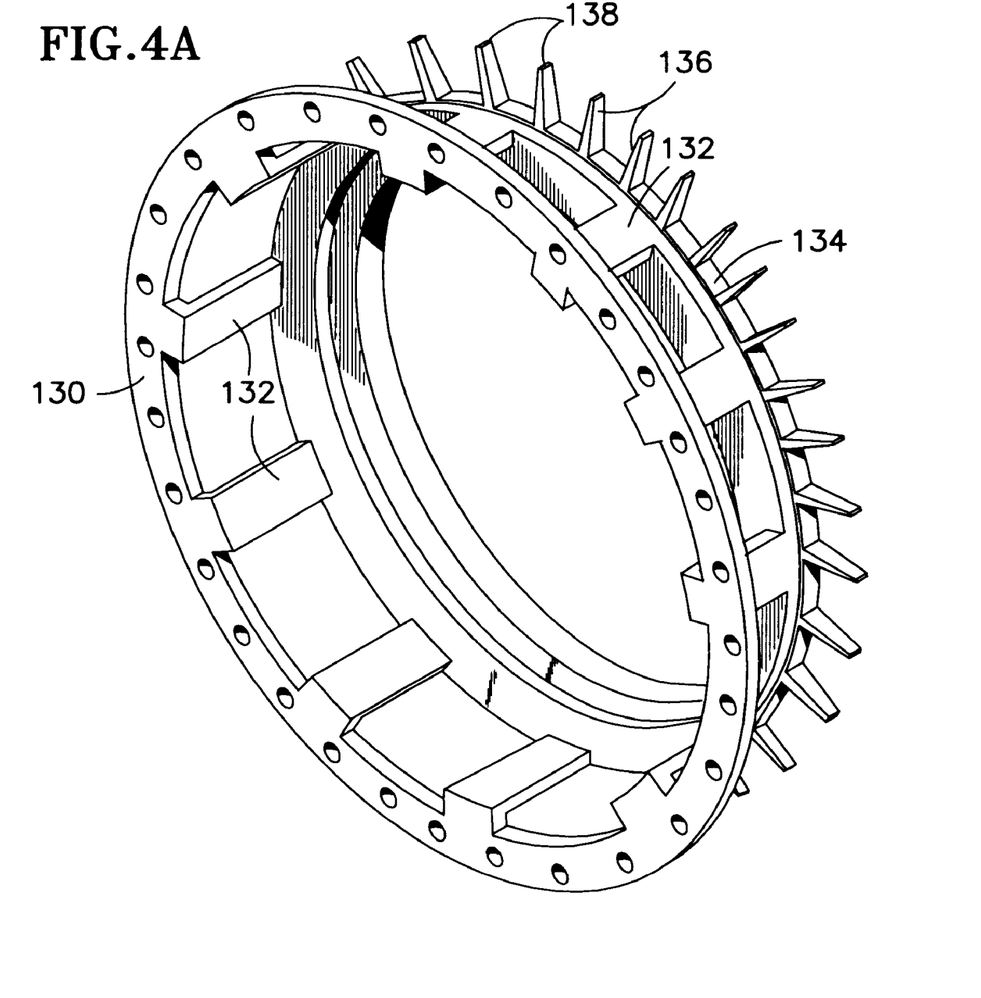
FIG. 4A is a perspective view of the special purpose fixture of FIG. 4.

The assembly sequence is substantially the reverse of the disassembly sequence. Assembly is facilitated by a special purpose fixture illustrated in use in FIG. 4 and in isolation in FIG. 4A. The fixture comprises a forward bolting flange 130 with a set of ribs 132 projecting axially from the flange to a spoke hub 134. A plurality of spokes 136 project radially from the spoke hub. The spoke tips 138 define a precise diameter for radially positioning the vanes in the module. During assembly, the vanes 1V are provisionally positioned in the module. The fixture flange 130 is temporarily bolted to case flange 142 with the spoke hub pressing axially against the forward edge of the vane inner shroud 40 and two spoke tips 138 bearing against the inner surface of each vane outer shroud 38. The fixture thus urges the vanes axially, causing each vane foot abutment surface 104 to slide along the case guide surface 24 until the attachment ear contact surface 110 contacts the vane support lug contact surface 30. The fixture also positions the vanes radially with minimal variation in the radial position of each vane relative to the others. Once the vanes are positioned, the retaining bolts 89 are installed and the fixture is unbolted from case flange 142 and removed. The balance of the reassembly sequence proceeds in substantially the reverse order of the disassembly sequence.

Although this invention has been shown and described with reference to a detailed embodiment thereof, it will be understood by those skilled in the art that various changes in form and detail may be made without departing from the invention as set forth in the accompanying claims.

We claim:

1. A turbomachinery module for a turbine engine, the module comprising a case having a substantially frustoconical wall that converges from a larger diameter end of the case to a smaller diameter end of the case axially spaced from the larger diameter end and that circumscribes an array of vanes, each vane of the array having a proximal end and a distal end relative to the smaller diameter end of the case, each vane also having an inner shroud, an outer shroud and an airfoil extending between the inner and outer shrouds, the distal end of each vane outer shroud including a foot in abutting, nonfastened relationship with a vane guide on the case and the proximal end of each vane outer shroud including an attachment bracket removably secured to a vane support on the case at a separable interface accessible from the smaller end of the case and wherein upon disengagement of each bracket from the vane support the corresponding vane is separable from the case and removable from the module through the smaller diameter end of the case.

2. The turbomachinery module of claim 1 wherein the vane support is a set of inwardly extending lugs and each attachment bracket comprises one or more ears extending outwardly from the outer shroud of a vane.

3. The turbomachinery module of claim 1 wherein the vane support and the attachment brackets include aligned sets of bolt holes, and the vanes are removably secured to the vane support by bolts whose shanks extend through the bolt holes.

4. The turbomachinery module of claim 3 wherein the vane support bolt holes are dissimilarly sized relative to the attachment bracket bolt holes and at least one of the sets of bolt holes is oversized relative to the bolt shanks so that the vanes are secured to the case at least in part by frictional resistance between mutually contacting surfaces of the vane support and the attachment brackets.

5. The turbomachinery module of claim 4 wherein the mutually contacting surfaces are textured to enhance the frictional resistance.

6. The turbomachinery module of claim 1 wherein each outer shroud includes a slot extending substantially the entire length of each of the lateral edges of the outer shroud and each inner shroud also includes a slot extending substantially the entire length of each of the lateral edges of the inner shroud, and a set of featherseals extends circumferentially between the shrouds of adjacent vanes of the vane array, the featherseals being captured circumferentially in the slots and being removable from the slots exclusively by translation approximately parallel to their respective slots.

7. The turbomachinery module of claim 1 wherein the vane support, the attachment bracket, the vane guide and the vane foot each have a contact surface, the attachment bracket contact surface and the vane support contact surface establish a proximal contact plane, the vane foot contact surface and the vane guide contact surface establish a distal contact plane, the contact planes being nonparallel to each other.

8. The turbomachinery module of claim 7 wherein the contact planes are substantially perpendicular to each other.

9. The turbomachinery module of claim 8 wherein the proximal contact plane is approximately perpendicular to the frustoconical case wall and the distal contact plane is approximately parallel to the frustoconical case wall.

10. The turbomachinery module of claim 1 wherein the smaller diameter end of the case has a controlling diameter and the vanes of the vane array project radially to a diameter substantially greater than the controlling diameter.

11. A turbomachinery module for a turbine engine, the module comprising a case disposed about an axially extending centerline, the case having a wall that includes a vane guide with a guide surface and a vane support with a contact surface, the case circumscribing an array of vanes, each vane of the array having a proximal end and a distal end relative to a smaller diameter end of the case, each vane also having an inner shroud, an outer shroud and an airfoil extending between the inner and outer shrouds, the distal end of each vane outer shroud including a foot with an abutment surface in abutting, nonfastened relationship with the vane guide surface along a distal plane of contact, the proximal end of each vane outer shroud including an attachment bracket with a contact surface, the attachment bracket being removably secured to the vane support with the bracket contact surface and the vane support contact surface in mutual contact along a proximal plane of contact, the planes of contact being nonparallel to each other.

12. The turbomachinery module of claim 11 wherein the vane support is a set of inwardly extending lugs and each attachment bracket comprises one or more ears extending outwardly from the outer shroud of a vane.

13. The turbomachinery module of claim 11 wherein the vane support and the attachment brackets include aligned sets of bolt holes, and the vanes are removably secured to the vane support by bolts whose shanks extend through the bolt holes.

14. The turbomachinery module of claim 11 wherein the vane support bolt holes are dissimilarly sized relative to the attachment bracket bolt holes and at least one of the sets of bolt holes is oversized relative to the bolt shanks so that the vanes are secured to the case at least in part by frictional resistance between mutually contacting surfaces of the vane support and the attachment brackets.

15. The turbomachinery module of claim 11 wherein the mutually contacting surfaces are textured to enhance the frictional resistance.

16. The turbomachinery module of claim 11 wherein the contact planes are substantially perpendicular to each other.

17. The turbomachinery module of claim 16 wherein the wall is frustoconical and the proximal contact plane is approximately perpendicular to the case wall and the distal contact plane is approximately parallel to the case wall.

18. The turbomachinery module of claim 11 wherein each outer shroud includes a slot extending substantially the entire length of each of the lateral edges of the outer shroud and each inner shroud also includes a slot extending substantially the entire length of each of the lateral edges of the inner shroud, and a set of featherseals extends circumferentially between the shrouds of adjacent vanes of the vane array, the featherseals being captured circumferentially in the slots and being removable from the slots exclusively by translation approximately parallel to their respective slots.

19. The turbomachinery module of claim 11 wherein the smaller diameter end of the case has a controlling diameter and the vanes of the vane array project radially to a diameter substantially greater than the controlling diameter.

* * * * *